US012294190B2

(12) United States Patent
López Portela et al.

(10) Patent No.: US 12,294,190 B2
(45) Date of Patent: May 6, 2025

(54) ROTARY HYBRID AC POWER OUTLET FOR VEHICLES

(71) Applicant: FORD GLOBAL TECHNOLOGIES, LLC, Dearborn, MI (US)

(72) Inventors: Silvia López Portela, Mexico City (MX); Rosa Fabiola Benitez Torres, Atizapán de Zaragoza (MX); Eduardo Arturo Aguilar Ruelas, Mexico City (MX); Maria Alejandra Cobos Reyes, Mexico City (MX); Ailen Flores Becerril, Toluca de Lerdo (MX)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 430 days.

(21) Appl. No.: 17/862,748

(22) Filed: Jul. 12, 2022

(65) Prior Publication Data

US 2024/0022032 A1 Jan. 18, 2024

(51) Int. Cl.
*H01R 27/00* (2006.01)
*B60R 16/03* (2006.01)
(Continued)

(52) U.S. Cl.
CPC ............. *H01R 27/00* (2013.01); *B60R 16/03* (2013.01); *H01R 13/447* (2013.01);
(Continued)

(58) Field of Classification Search
CPC ...... H01R 27/00; H01R 13/447; H01R 13/44; H01R 13/4532; H01R 13/502;
(Continued)

(56) References Cited

U.S. PATENT DOCUMENTS 5,066,238 A * 11/1991 Shieh ................. H01R 13/4532
439/139
7,033,225 B2  4/2006 Belanger, Jr.
(Continued)

FOREIGN PATENT DOCUMENTS

CN         114498152 A  *  5/2022
KR         100792890 B1     1/2008
KR         20170061956 A    6/2017

*Primary Examiner* — Justin M Kratt
(74) *Attorney, Agent, or Firm* — Frank L. Lollo; MacMillan, Sobanski & Todd, LLC

(57) ABSTRACT

An AC power outlet for an automotive center console comprises a bezel housing containing an array of terminals forming sockets for receiving power plugs according to a plurality of standardized plug layouts. Fixed and pivotable faceplates have respective openings according to first and second patterns for passage of respective prongs of the power plugs into the sockets. The pivotable faceplate is moved to (A) a first rotational position to reveal a first subset of openings on the fixed faceplate corresponding to a first standardized plug layout while blocking other openings, and (B) to a second rotational position reveal a second subset of the openings on the fixed faceplate corresponding to a second standardized plug layout while blocking other ones of the openings. A cover assembly has a cap and a mounting ring to install on the housing at any one of a plurality of angular positions.

14 Claims, 9 Drawing Sheets

(51) Int. Cl.
*H01R 13/447* (2006.01)
*B60R 16/00* (2006.01)
*H01R 13/44* (2006.01)
*H01R 13/453* (2006.01)
*H01R 13/502* (2006.01)
*H01R 24/66* (2011.01)
*H01R 24/76* (2011.01)
*H01R 24/78* (2011.01)

(52) U.S. Cl.
CPC ............ *B60R 16/005* (2013.01); *H01R 13/44* (2013.01); *H01R 13/4532* (2013.01); *H01R 13/502* (2013.01); *H01R 24/66* (2013.01); *H01R 24/76* (2013.01); *H01R 24/78* (2013.01); *H01R 2201/26* (2013.01)

(58) Field of Classification Search
CPC ........ H01R 24/66; H01R 24/76; H01R 24/78; H01R 2201/26; B60R 16/03; B60R 16/005
See application file for complete search history.

(56) References Cited

U.S. PATENT DOCUMENTS

| | | |
|---|---|---|
| 9,093,773 B2 | 7/2015 | Pietila et al. |
| 10,211,583 B2 * | 2/2019 | Liao ................... H01R 13/4532 |
| 10,840,657 B1 | 11/2020 | Aguilar Ruelas et al. |
| 2014/0259651 A1 | 9/2014 | Fletcher |

* cited by examiner

ROTARY HYBRID AC POWER OUTLET FOR VEHICLES

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to automotive trim panels having an integrated power outlet, and, more specifically, to an AC power outlet which is configurable to a plurality of standardized plug layouts and a plurality of cover hinge orientations.

Automotive vehicles (e.g., cars and trucks) typically include trim panels such as a center console or a dashboard disposed within the interior passenger compartment of the vehicle. The trim panels may provide a mounting location for an integrated electrical outlet, such as an AC power outlet for delivering AC power to electrical devices through a plug and socket arrangement. Since electrical systems of vehicles usually operate on DC power, a DC-to-AC power inverter may be used in the vehicle to generate the AC power which is fed to the power outlet. Typically, the power outlet is configured for use with a particular type of standard plug layout which is used in the region where the vehicle is sold and operated.

For specific models of vehicles, the respective automobile manufacturers may often produce nearly identical versions of the model for sale in different regions or countries of the world (e.g., North American and European versions of a vehicle). Variations between versions may include minor styling differences, functional differences driven by regulatory requirements, and differences in interfaces with or connections to different auxiliary/peripheral accessories used by occupants of the vehicle. For example, a North American version of a vehicle which provides an AC power outlet may be configured with a plug/socket layout as defined by NEMA (e.g., a NEMA 5-15 layout), which is also defined as a Type B plug by the International Trade Administration. A European version of the same vehicle may have the power outlet configured with a plug/socket layout according to Type G or Type C as defined by the International Trade Administration or the Europlug as defined by the International Electrotechnical Commission. Since the power outlet is not a common component across all the versions of the vehicle model, the costs of design, development, and testing must be incurred by the manufacturer for each distinct design. Especially for a manufacturer making many models of vehicle, with each model being made in multiple versions for respective worldwide markets, the costs and effort devoted to customizing power outlets for each distinct version becomes significant.

An automotive trim panel, such as a center console, with an integrated AC power outlet typically carries other devices such as USB outlets, climate control and radio buttons and dials, and air duct registers. Styling needs may necessitate placement of a cover or cap for the AC power outlet to be at a particular position and/or orientation relative to other components. Since cover or cap (which is usually tethered to the outlet by a hinge and which snaps on and off of the outlet) requires available adjacent space for its normal operation to avoid interference with other components or with portions of the trim panel itself, the side where the hinge is located may be dictated by other elements of the vehicle design. For example, the hinge may be along a right edge in one version while a different placement of the power outlet on a center console for a different version requires the hinge to be at the top edge. This may result in larger differences between designs for power outlets, and it may increase the need for producing many different outlet designs (i.e., increase the number of difference parts that mush be released in the manufacturer's parts systems).

SUMMARY OF THE INVENTION

One object of the invention is to reduce the duplication of component parts by providing a power outlet which is adaptable to many different standardized plug layouts and which provides a cover assembly which is adjustable to many different hinge orientations without changing the main orientation of the plug/socket arrangement.

In one aspect of the invention, an AC power outlet comprises a bezel housing containing an array of terminals forming sockets for receiving power plugs according to a plurality of standardized plug layouts. A fixed faceplate is disposed in the bezel housing at a front side of the array of terminals including a first plurality of openings in a first pattern for passage of respective prongs of the power plugs into the sockets. A pivotable faceplate is disposed in the bezel housing at a front side of the fixed faceplate and rotatable with respect to the fixed faceplate. The pivotable faceplate has a second plurality of openings in a second pattern which is configured to (A) reveal a first subset of the first openings corresponding to a first one of the standardized plug outlets while blocking other ones of the first openings when the pivotable faceplate is in a first rotational position, and (B) reveal a second subset of the first openings corresponding to a second one of the standardized plug outlets while blocking other ones of the first openings when the pivotable faceplate is in a second rotational position.

DETAILED DESCRIPTION OF PREFERRED EMBODIMENTS

Figure 1:
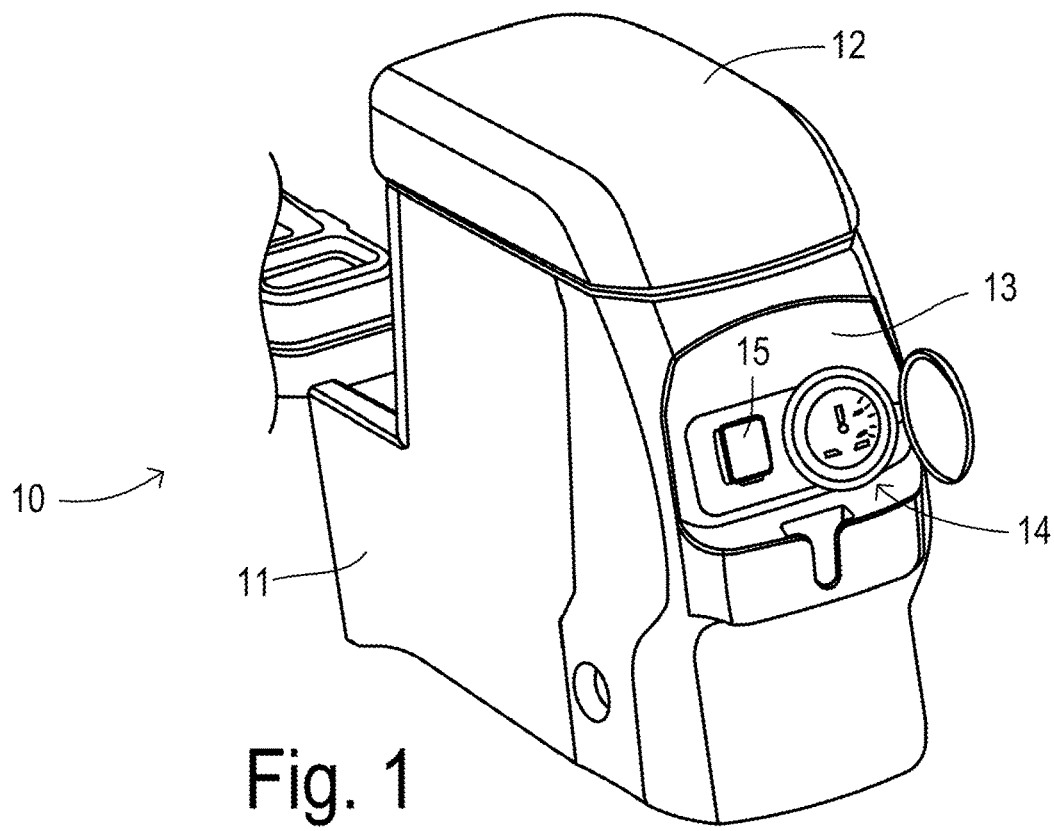
FIG. 1 is a perspective view of a center console with an integrated AC power outlet.
Figure 2:
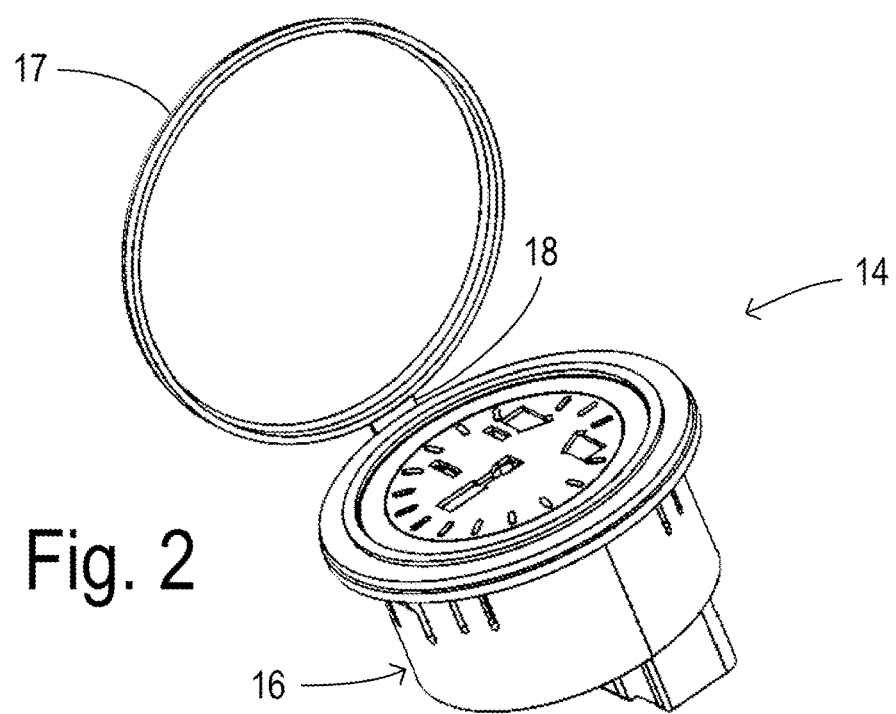
FIG. 2 is a perspective view of an AC power outlet according to an embodiment of the invention.

Referring to FIG. 1, a vehicle 10 includes a center console 11 with a storage compartment covered by a lid 12. A rearward face of trim panel 13 provides a mounting surface for an AC power outlet 14 (e.g., for use by vehicle passengers in a back seat area of the passenger compartment). Other components mounted on panel 13 may include another electrical outlet 15 such as a USB connector and cover for in-vehicle device charging or data use. Power outlet 14 is configured to accept standardized plug layouts of various types and has a cover assembly with a design enabling the cover to be installed with a selected orientation in order to accommodate a large number of potential hinge orientations. From a user perspective, as shown in FIG. 2, power outlet 14 has a main outlet portion 16, a lid 17, and a hinge 18. Lid 17 may include a snap-on feature (e.g., a mechanical interlock opposite from the hinge) or other means for being locked into a closed position over outlet portion 16 as known in the art.

Figure 3:
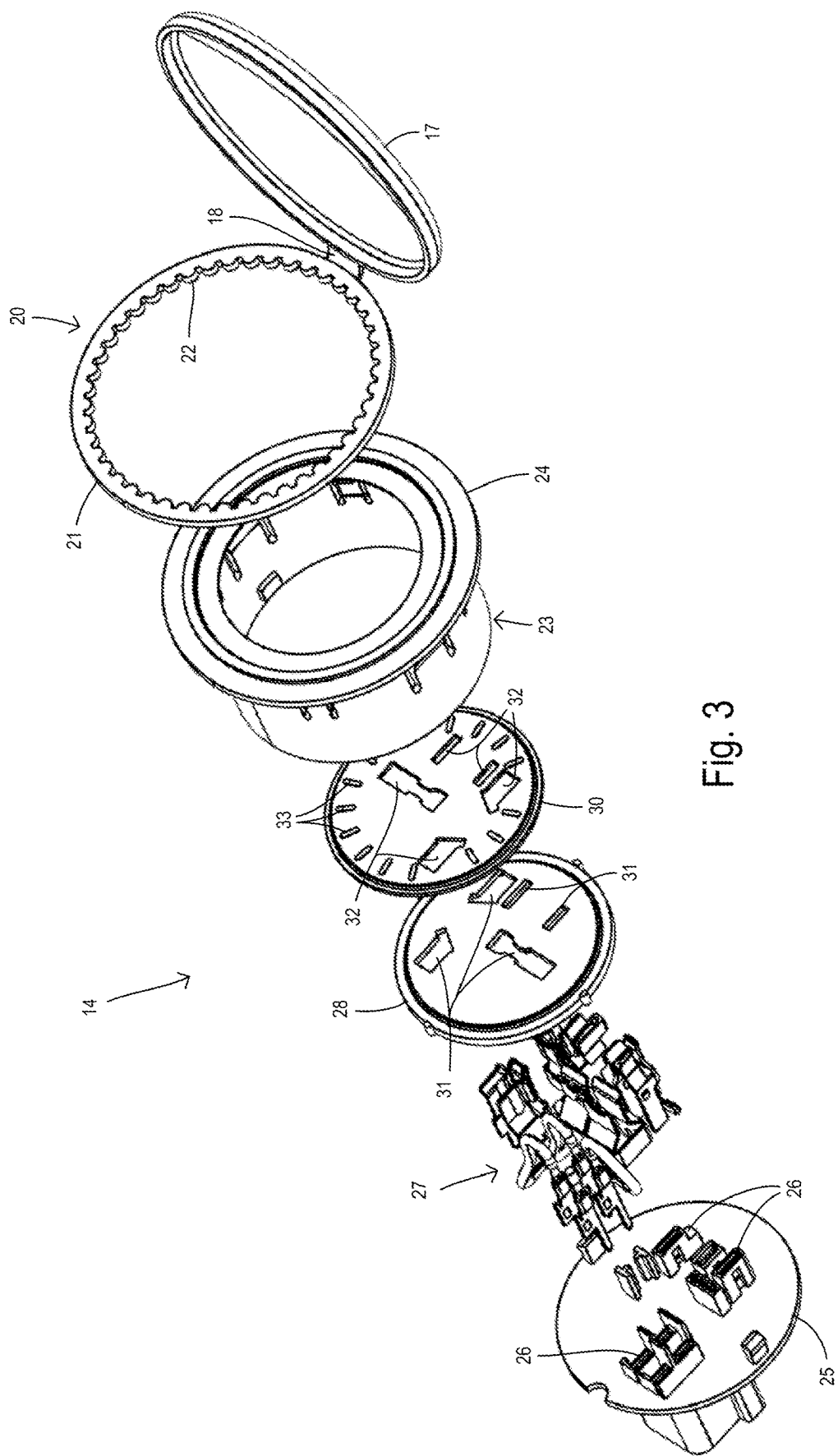
FIG. 3 is an exploded view of the power outlet of FIG. 2.

FIG. 3 shows the elements of a first embodiment of power outlet 14. Cover assembly 20 comprises lid 17 connected by hinge 18 to a mounting ring 21 with a series of serrations 22 along an inner radial edge of ring 21. A generally cylindrical bezel housing 23 has a front flange 24 providing a forward lip disposed on the trim panel front surface. Mounting ring 21 is installed from the rearward end of bezel housing 23 in order to nest against a rearward surface of flange 24 as described below. A base plate 25 includes slots 26 for receiving ends of an array of terminals 27 forming electrical sockets which are configured to receive plugs of different standardized layouts in different orientations. Base 25 and terminal assembly 27 are received inside a cylindrical portion of bezel housing 23 behind a fixed faceplate 28 and pivotable faceplate 30. Fixed faceplate 28 has a first plurality of openings 31 having a first pattern for passage of respective prongs of power plugs to be plugged into corresponding sockets provided by terminal array 27. Pivotable faceplate 30 is disposed at a front side of fixed faceplate 28 and has a second plurality of openings 32 and a second pattern which is also configured to pass respective prongs of the power plugs. The second pattern is configured such that when pivotable faceplate 30 is in a first rotational position then a first subset of openings 31 are revealed, and when pivotable faceplate 30 is in a second rotational position then a second subset of openings 31 are revealed while at least some of the first subset are blocked. Pivotable faceplate 30 may include a series of protrusions 33 disposed circumferentially around a front side of pivotable faceplate 30 for gripping by a user's fingers when rotating faceplate 30. Pivotable faceplate 30 is captured in a recess between fixed faceplate 28 and flange 24 as described later.

Figure 4:
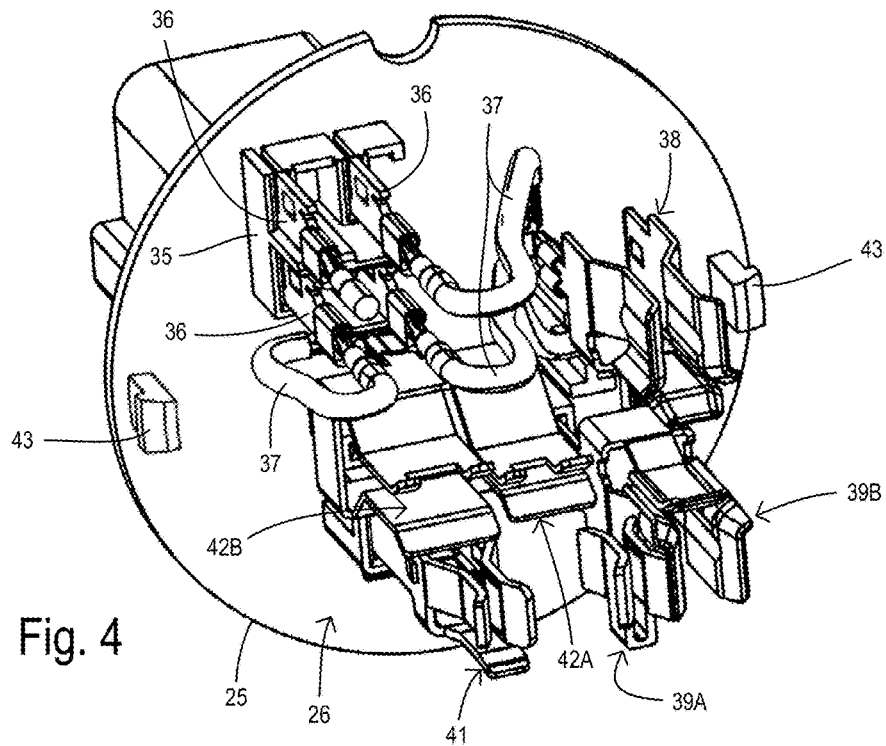
FIG. 4 is a front, perspective view of a base plate and an array of terminals for the power outlet of FIG. 2.

FIG. 4 shows terminal array 27 arranged on faceplate 25. Slots for supporting terminal array 27 include bushings 35 for mounting terminal blades 36 which are coupled by jumper wires 37 to respective sockets 38-42. Each socket may be comprised of a respective double-wipe or triple-wipe contact, for example. Some sockets may include terminal structures which are shaped to provide more than one set of wipe contacts, such as terminal 42 with double-wipe contacts 42A and double-wipe contacts 42B and terminal 39 with double-wipe contacts 39A and triple-wipe contacts 39B. Tabs 43 on base plate 25 interface with corresponding features of the bezel housing to retain base plate 25.

Figure 5:
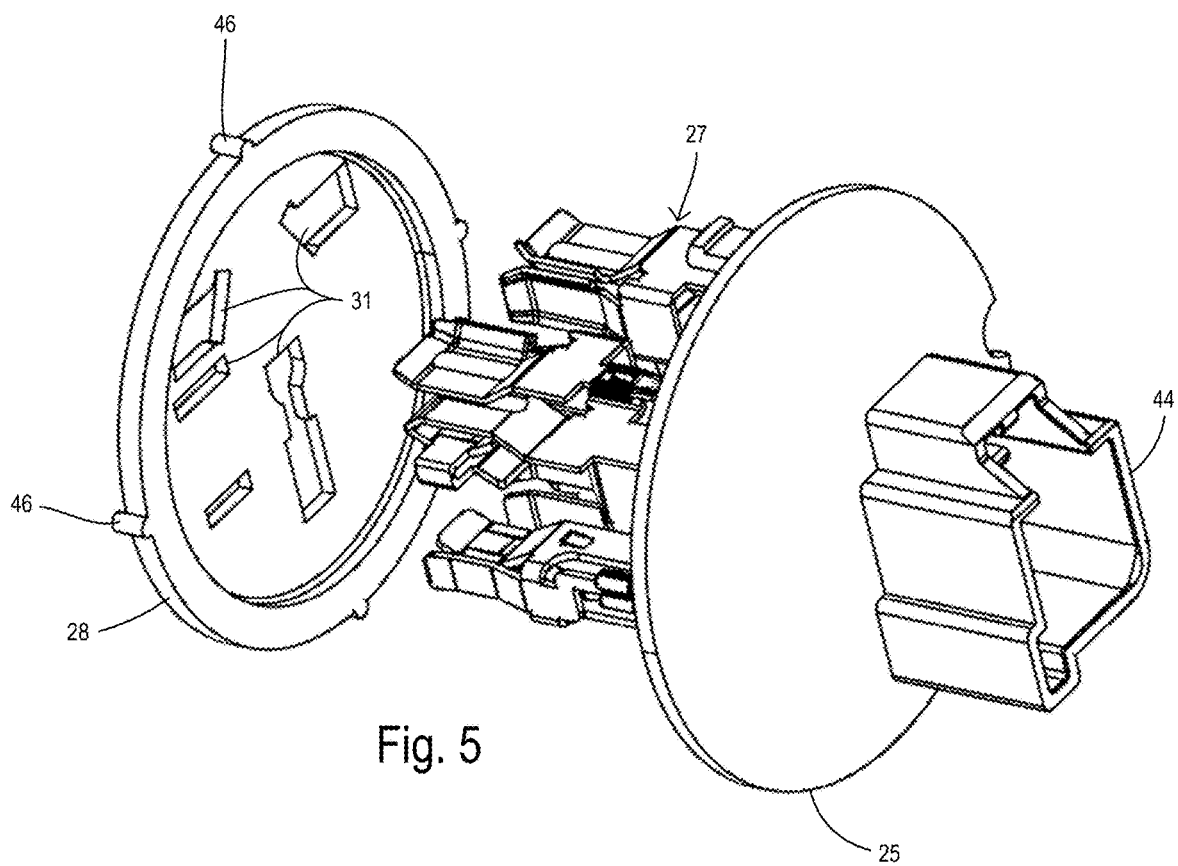
FIG. 5 is a partial exploded view showing the base plate, array of terminals, and a fixed faceplate for the power outlet of FIG. 2.

Bushings 35 include openings through base plate 25 for receiving terminal blades 36. Terminal blades 36 are commonized such that they are shared between the standardized plug layouts (e.g., as a result of the sets of wipe contacts configured to receive more than one plug layout). FIG. 5 shows a collar 44 into which blades 36 extend, whereby a wiring pigtail connector can be joined to the AC power outlet. FIG. 5 also shows the alignment of fixed faceplate 28 with terminal array 27, wherein openings 31 are adapted to guide respective prongs of a plug into corresponding sockets. Fixed faceplate 28 may include radial tabs 46 which extend into corresponding notches in the bezel housing to keep faceplate 28 in proper alignment.

Figure 6:
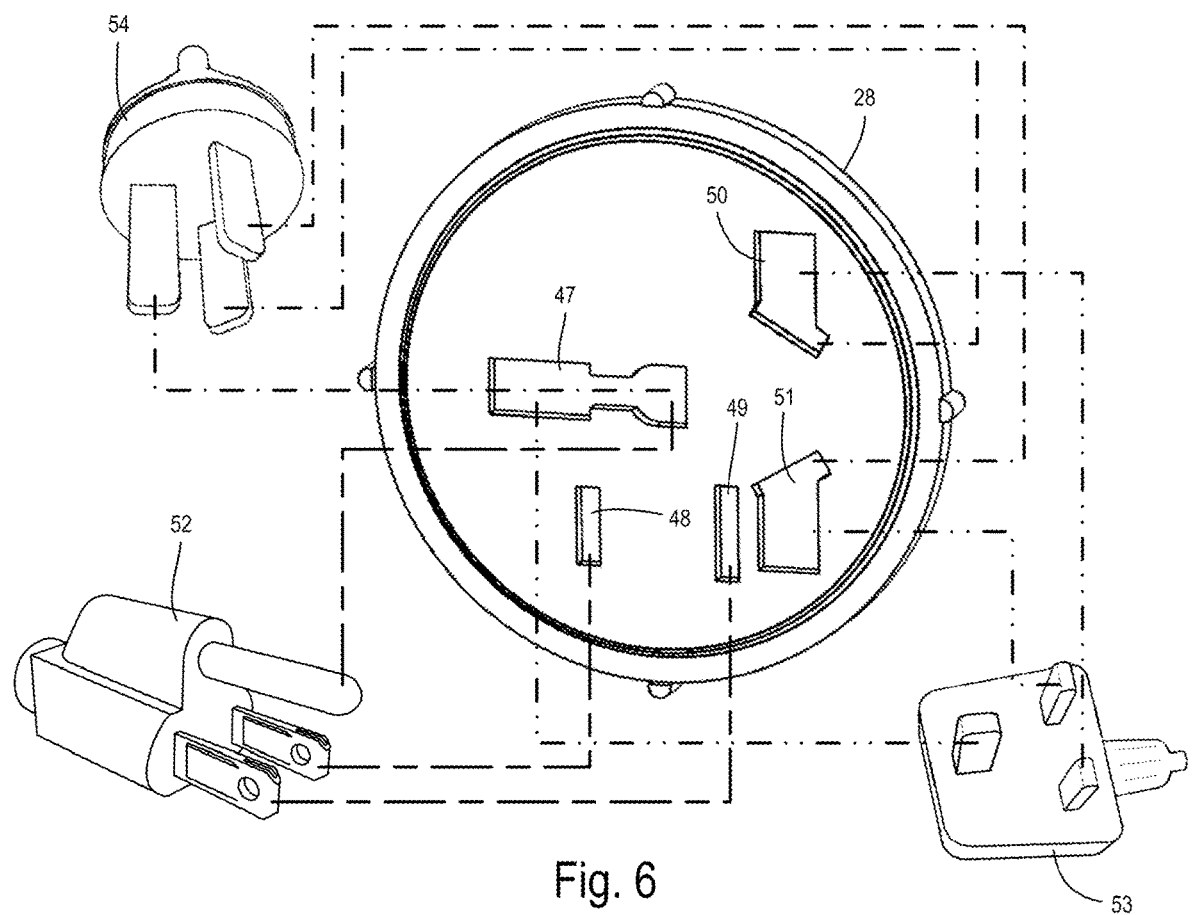
FIG. 6 is a schematic view showing insertion locations through the faceplate for various standardized plug layouts.

FIG. 6 shows fixed faceplate 28 with an example pattern for holes 47-51 which accommodates particular examples of standardized plug layouts. For example, a plug 52 with a North American NEMA 5-15 (Type B) layout is insertable through hole 47 (for the grounding prong), hole 48 (for the hot or line prong), and hole 49 (for the neutral or common prong). A plug 53 has an ITA Type G layout, and it is insertable through hole 47 (for ground), a hole 50 (for hot), and hole 51 (for neutral). A plug 54 has an ITA Type I layout, and it is insertable through hole 47 (for ground), a hole 50 (for hot), and hole 51 (for neutral). Together with a matching terminal arrangement, a "universal" power outlet is provided with is compatible with the corresponding global standards.

Figure 7:
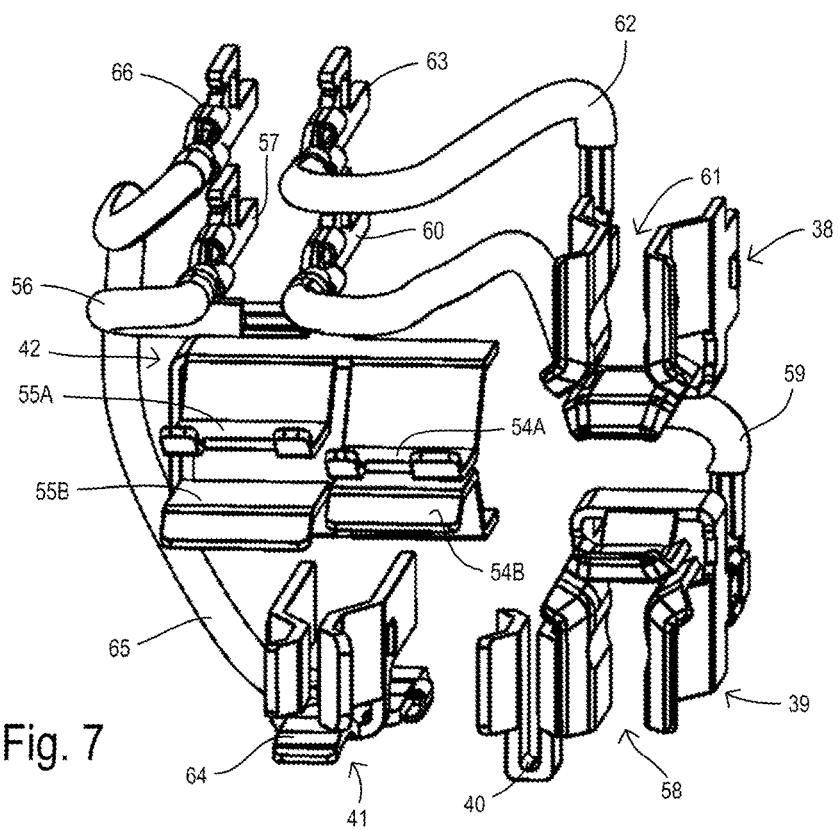
FIG. 7 is a front view of the array of terminals.
Figure 8:
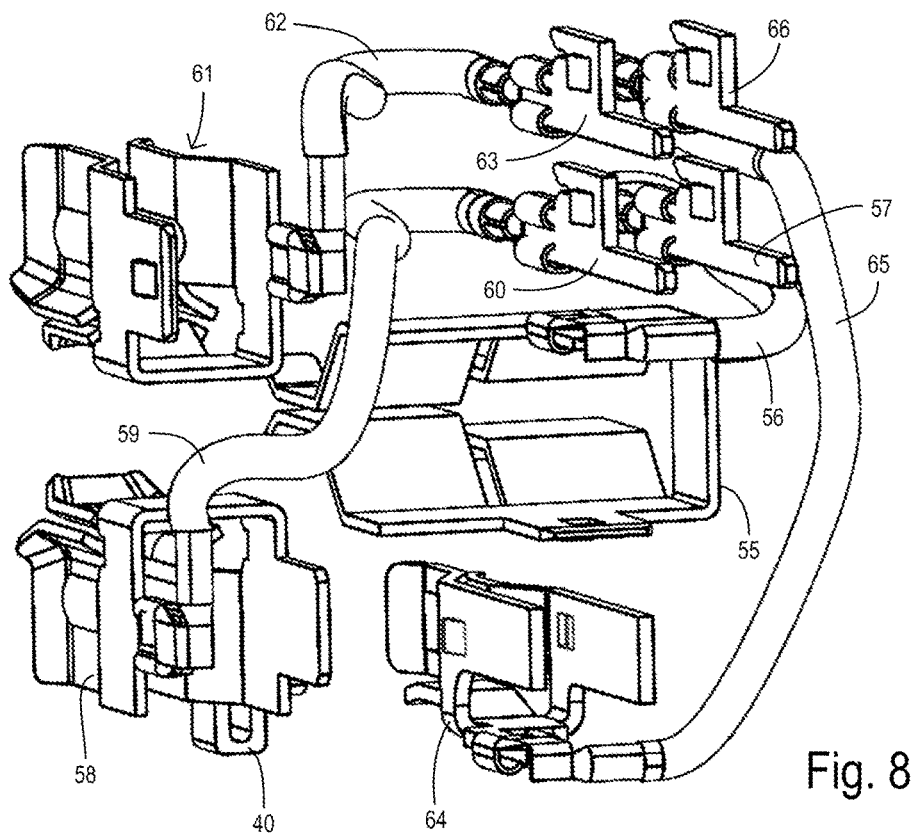
FIG. 8 is a rear, perspective view of the array of terminals.

The terminal arrangement of an embodiment combining terminal sockets for Type B and Type G layouts is shown in greater detail in FIGS. 7 and 8. A terminal 55 provides contacts for receiving grounding prongs for both Type B and Type G. One continuous terminal structure 42 includes a double-wipe contact 54A/54B for the Type B plug and a double-wipe contact 55A/55B for the Type G plug, wherein hole 47 of fixed faceplate 28 is aligned with terminal 42. Jumper wire 56 connects terminal 42 to a terminal blade 57 which is fitted into the base plate.

A terminal 39 provides contacts for receiving the neutral or common prongs for both Type B and Type G. One continuous terminal structure includes a double-wipe contact 40 for the Type B plug and a triple-wipe contact 58 for the Type G plug, wherein holes 49 and 51 of fixed faceplate 28 is aligned with contact 40 and contact 51, respectively. Jumper wire 59 connects terminal 39 to a terminal blade 60 which is fitted into the base plate.

Terminal 41 provides contacts for receiving the hot prong for Type B comprised of a triple-wipe contact 64, wherein hole 48 of fixed faceplate 28 is aligned with contact 64. Jumper wire 65 connects terminal 41 to a terminal blade 66 which is fitted into the base plate. Terminal 38 provides contacts for receiving the hot prong for Type G comprised of a triple-wipe contact 61, wherein hole 50 of fixed faceplate 28 is aligned with contact 61. Jumper wire 62 connects terminal 38 to a terminal blade 63 which is fitted into the base plate.

Figure 9:
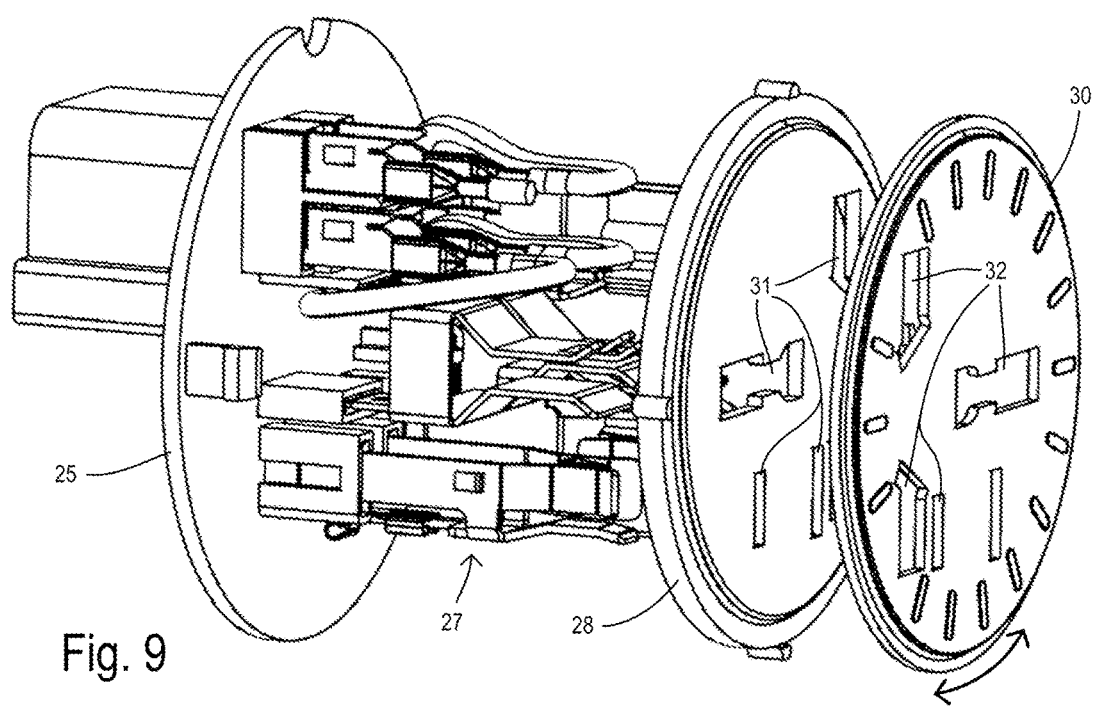
FIG. 9 is a partial exploded view showing the base plate, array of terminals, fixed faceplate, and a pivotable faceplate for the power outlet of FIG. 2.
Figure 10:
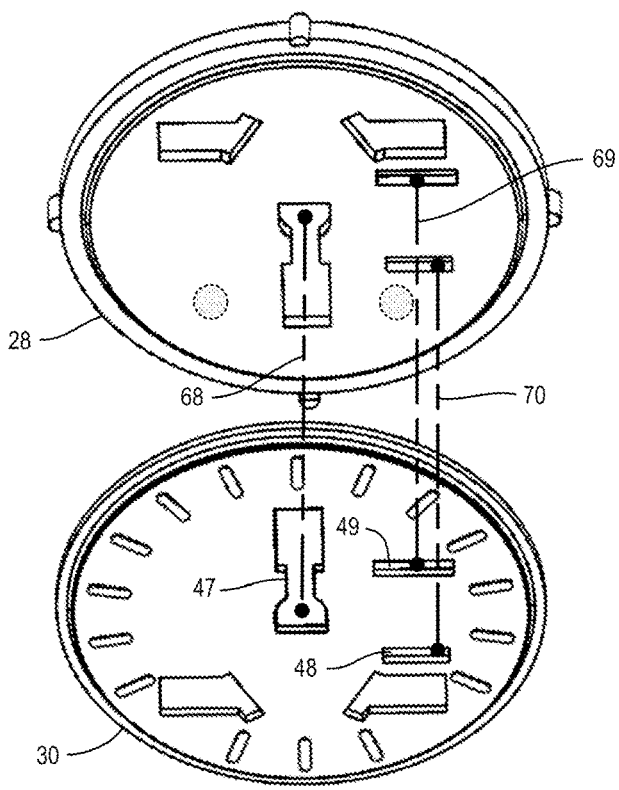
FIGS. 10 and 11 are exploded, perspective views of the fixed faceplate and pivotable faceplate at different respective rotational positions for accepting different types of plug layouts.
Figure 11:
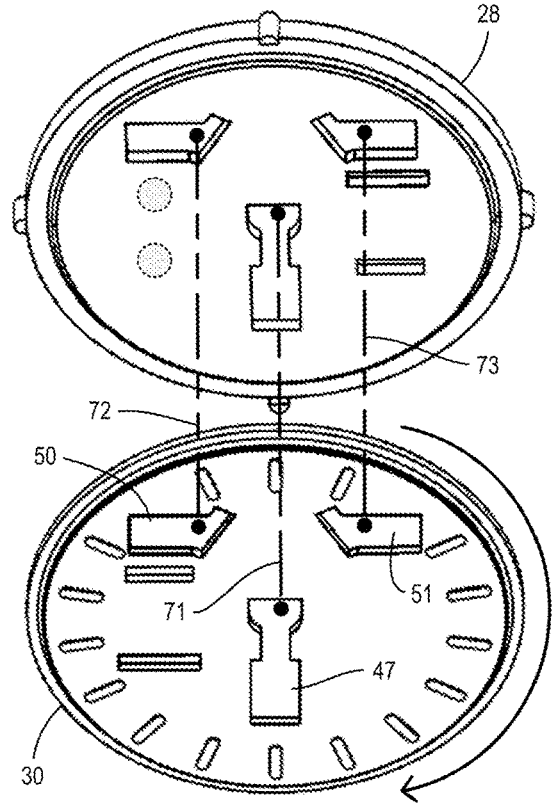

FIG. 9 depicts the interaction of faceplates 28 and 30 with terminal array 27. Fixed faceplate 28 has a first pattern of openings which remains fixed with respect to array 27 and ensures that only plugs with predetermined standard arrangements can be guided into the sockets of array 27. Pivotable faceplate 30 has a second pattern of openings which is different from the first pattern which is configured to (A) reveal a first subset of the fixed openings corresponding to a first one of the standardized plug layouts (e.g., Type B) while blocking at least some of the openings in fixed faceplate 28 (e.g., openings exclusively used by Type G) when pivotable faceplate 30 is in a first rotational position, and (B) reveal a second subset of the first openings corresponding to a second one of the standardized plug layouts (e.g., Type G) while blocking at least some of the first openings (e.g., openings exclusively used by Type B) when pivotable faceplate 30 is in a second rotational position. For a terminal socket which is shared by all (e.g., both) of the standardized plug types, one convenient location is at the central axis of the rotation of pivotable faceplate 30. When the power outlet is configured for two rotational positions in order to reveal two different sets of sockets, and when the two rotational positions are 180° apart, then the second pattern may be configured according to a mirror image of the first pattern as shown in FIGS. 10 and 11. In the first rotational position of FIG. 10, openings 47, 48, and 49 provide paths 68-70 to respective sockets through faceplate 28. In the second rotational position of FIG. 11, openings 47, 50, and 51 provide paths 71-73 to respective sockets through faceplate 28.

Figure 12:
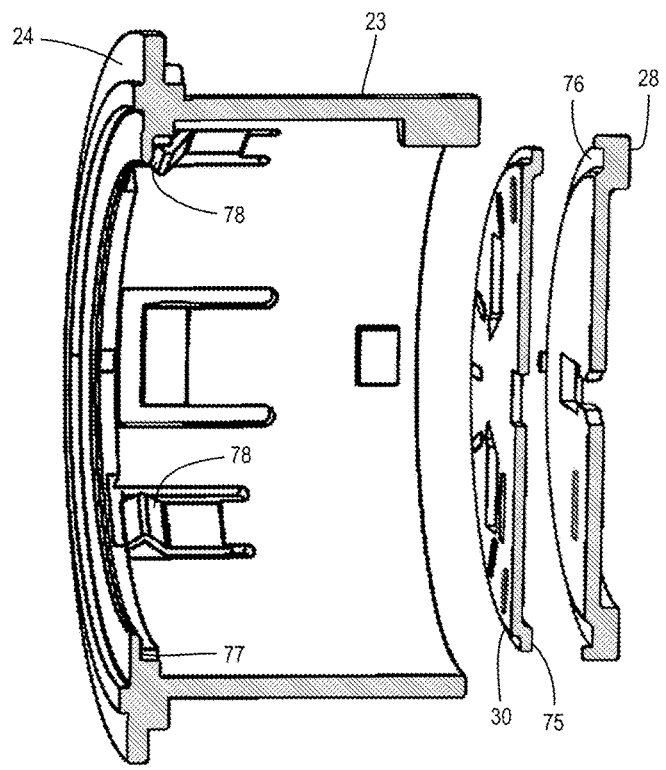
FIG. 12 is a partially exploded, cross sectional view of a bezel housing, fixed faceplate, and pivotable faceplate.
Figure 13:
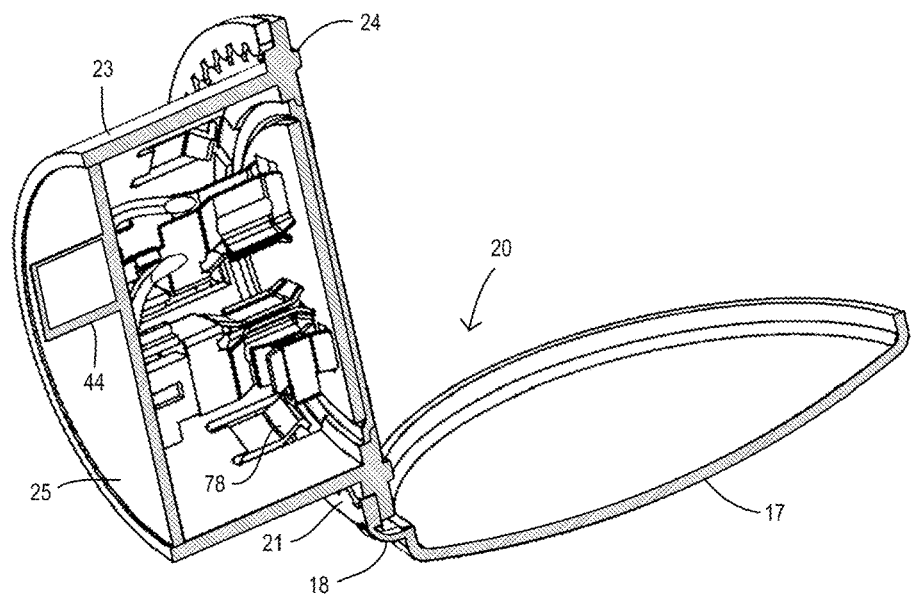
FIG. 13 is a cross-sectional view of the power outlet with a cover assembly.

As shown in FIG. 12, a rim flange 75 at an outer edge of pivotable faceplate 30 is adapted to be captured in a circular track 76 on a front side of fixed faceplate 28. Faceplates 28 and 30 are insertable into the cylindrical interior of bezel housing 23 and pressed against front flange 24 so that a plurality of clips 78 formed in the cylindrical wall of bezel housing 23 capture fixed faceplate 28 at a predetermined orientation. Rim flange 75 rotates within a gap between track 76 and a rearward surface 77 of front flange 24. FIG. 13 shows pivotable faceplate 30 bearing against front flange 24 (with fixed faceplate 28 not shown).

FIG. 13 further shows cover assembly 20 as a unitary molded body in which lid 17, hinge 18, and ring 21 are comprised of thermoplastic. Hinge 18 is comprised of a living hinge such that lid 17 can be opened and closed by pivoting from hinge 18. Ring 21 can be installed from the rearward side of bezel housing 23 to bear against flange 24 on its rearward surface.

Figure 14:
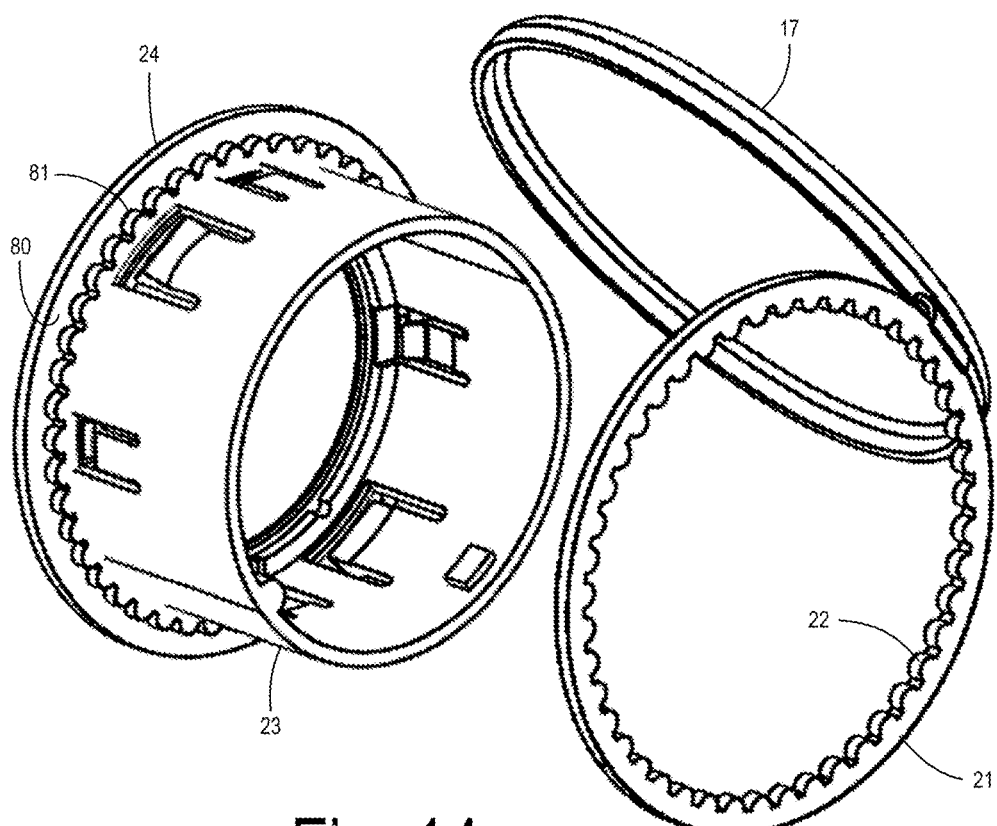
FIG. 14 is a rear, perspective view of the cover assembly and bezel housing.
Figure 15:
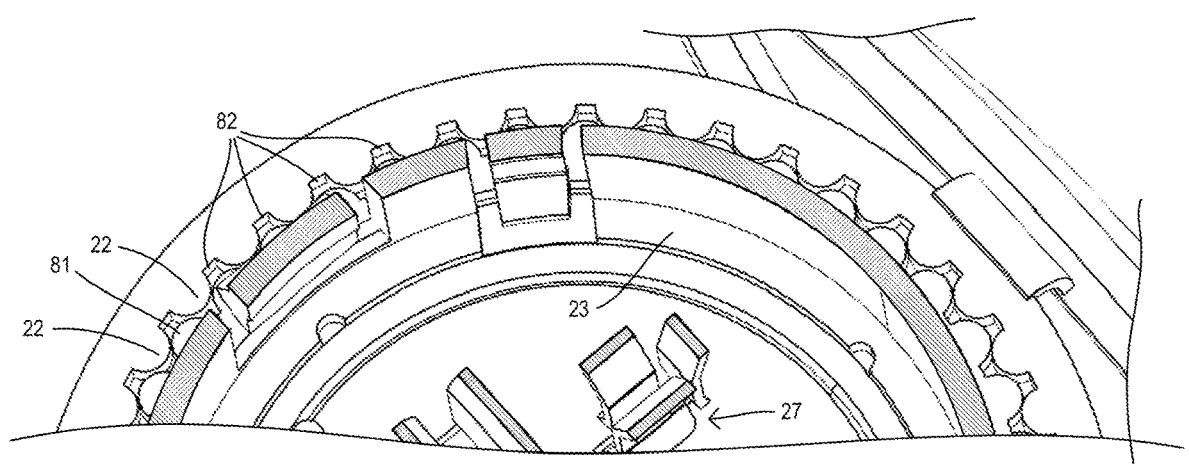
FIG. 15 is a rear view of the bezel housing and cover assembly showing a serrated interface in greater detail.

In order to permit various orientations of cover assembly 20 which can place hinge 18 at almost any desired radial angle, ring 21 is configured to engage bezel housing 23 via a multi-position interlock. As shown in FIGS. 14 and 15, a rearward surface 80 of front flange 24 is bounded by a keyed surface 81 behind flange 24 which is adapted to fit within an inner edge of ring 21. Keyed surface 81 may be comprised of a series of serrations following a concentric path. Adjacent serrations of keyed surface 81 may be separated by respective gaps 82. Mounting ring 21 has a complementary surface for engaging keyed surface 81 so that mounting ring 21 can be nonrotatably retained at any one of a plurality of angular positions. The complementary surface may be comprised of another series of serrations along an inner radial edge of mounting ring 21. Serrations 22 and 81 may have convex, circular shapes or any appropriate interlocking profile. Gaps 82 can increase the interpenetration of serrations 22 and 81 in order to improve the robustness of retention of mounting ring 21 in a desired orientation.

Figure 16:
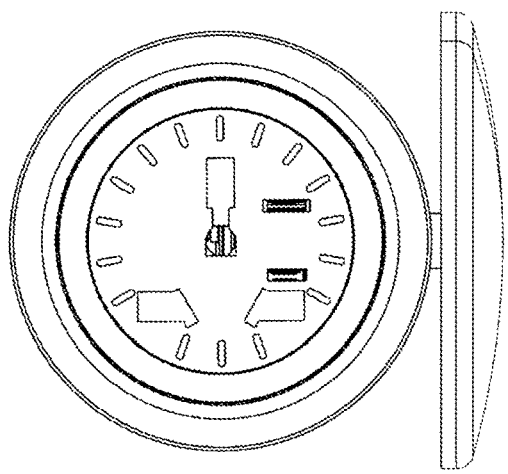
FIGS. 16-18 are plan views of the power outlet with the cover assembly installed at various orientations.
Figure 17:
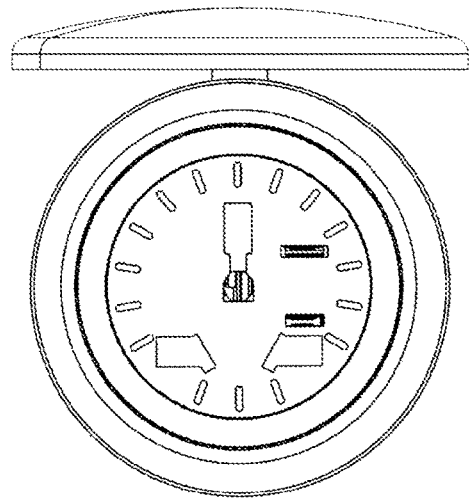
Figure 18:
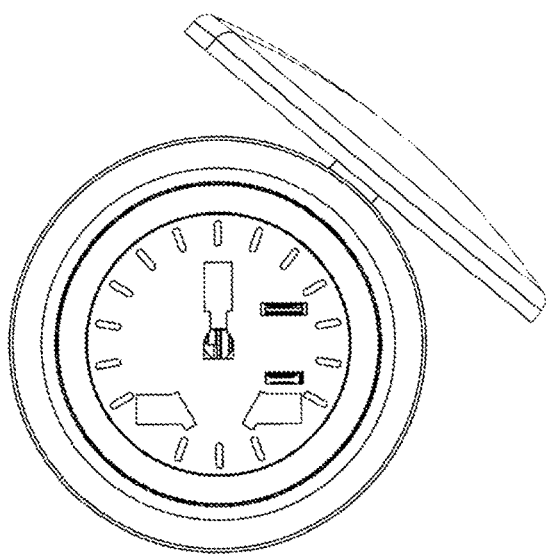
Figure 19:
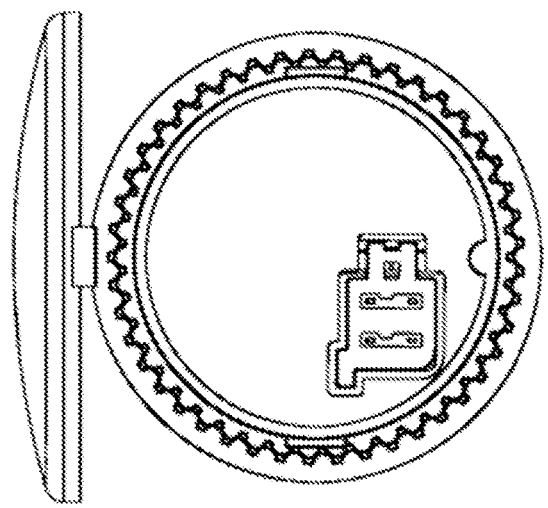
FIG. 19 is a rear view of the power outlet according to FIG. 2.

FIG. 16-18 illustrate the ability to adjust an opening direction of the cap of the power outlet toward different radial directions so that the motion of the cap/lid can be integrated according to different center console designs using the same power outlet components. The rear view in FIG. 19 shows that the radial angle toward which the hinge is oriented can be selected during installation of the cover assembly by aligning the hinge with any one of the serrations of the keyed surface on the bezel housing. A greater or lesser number of serrations can be provided around the circumferences of the surfaces when it is desired to provide either a greater angular resolution for orienting the hinge (more serrations) or a lower angular resolution to simplify assembly and reduce the likelihood of placement errors (fewer serrations).

What is claimed is:

1. An AC power outlet comprising:
   a bezel housing;
   an array of terminals in the bezel housing forming sockets for receiving power plugs according to a plurality of standardized plug layouts;
   a fixed faceplate disposed in the bezel housing at a front side of the array of terminals including a first plurality of openings in a first pattern for passage of respective prongs of the power plugs into the sockets;
   a pivotable faceplate disposed in the bezel housing at a front side of the fixed faceplate and rotatable with respect to the fixed faceplate, wherein the pivotable faceplate has a second plurality of openings in a second pattern which is configured to (A) reveal a first subset of the first openings corresponding to a first one of the standardized plug layouts while blocking other ones of the first openings when the pivotable faceplate is in a first rotational position, and (B) reveal a second subset of the first openings corresponding to a second one of the standardized plug layouts while blocking other ones of the first openings when the pivotable faceplate is in a second rotational position; and
   cover assembly which comprises:
   a mounting ring adapted to install on an exterior of the bezel housing which has a keyed surface, wherein the mounting ring has a complementary surface for engaging the keyed surface so that the mounting ring is nonrotatably retained at any one of a plurality of angular positions;
   a cap configured to close over an end of the bezel housing to cover the faceplates; and
   a hinge interconnecting the mounting ring and the cap.

2. The AC power outlet of claim 1, wherein the complementary surface is comprised of a first series of serrations along an inner radial edge of the mounting ring.

3. The AC power outlet of claim 2, wherein the bezel housing includes a front radial flange, wherein the keyed surface is disposed behind the radial flange, and wherein the keyed surface is comprised of a second series of serrations.

4. The AC power outlet of claim 1, wherein the cover assembly is comprised of a unitary molded body, and wherein the hinge is comprised of a living hinge.

5. The AC power outlet of claim 1, wherein each terminal in the array of terminals is comprised of at least one double-wipe contact.

6. The AC power outlet of claim 1, wherein the array of terminals further comprises terminal blades configured to connect with a pigtail connector, wherein the terminal blades are shared between the standardized plug layouts.

7. The AC power outlet of claim 1, wherein the second pattern is configured according to a mirror image of the first pattern.

8. A center console for a vehicle interior, comprising:
   a trim compartment having an outer shell; and an AC power outlet mounted on the outer shell comprising:
  a bezel housing;
  an array of terminals in the bezel housing forming sockets for receiving power plugs according to a plurality of standardized plug layouts;
  a fixed faceplate disposed in the bezel housing at a front side of the array of terminals including a first plurality of openings in a first pattern for passage of respective prongs of the power plugs into the sockets;
  a pivotable faceplate disposed in the bezel housing at a front side of the fixed faceplate and rotatable with respect to the fixed faceplate, wherein the pivotable faceplate has a second plurality of openings in a second pattern which is configured to (A) reveal a first subset of the first openings corresponding to a first one of the standardized plug layouts while blocking other ones of the first openings when the pivotable faceplate is in a first rotational position, and (B) reveal a second subset of the first openings corresponding to a second one of the standardized plug layouts while blocking other ones of the first openings when the pivotable faceplate is in a second rotational position; and
  a cover assembly comprising:
    a mounting ring adapted to install on an exterior of the bezel housing which has a keyed surface, wherein the mounting ring has a complementary surface for engaging the keyed surface so that the mounting ring is nonrotatably retained at any one of a plurality of angular positions;
    a cap configured to close over an end of the bezel housing to cover the faceplates; and
    a hinge interconnecting the mounting ring and the cap.

9. The center console of claim 8, wherein the complementary surface is comprised of a first series of serrations along an inner radial edge of the mounting ring.

10. The center console of claim 9, wherein the bezel housing includes a front radial flange, wherein the keyed surface is disposed behind the radial flange, and wherein the keyed surface is comprised of a second series of serrations.

11. The center console of claim 9, wherein the cover assembly is comprised of a unitary molded body, and wherein the hinge is comprised of a living hinge.

12. The center console of claim 8, wherein each terminal in the array of terminals is comprised of at least one double-wipe contact.

13. The center console of claim 8, wherein the array of terminals further comprises terminal blades configured to connect with a pigtail connector, and wherein the terminal blades are shared between the standardized plug layouts.

14. The center console of claim 8, wherein the second pattern is configured according to a mirror image of the first pattern.

* * * * *